United States Patent
Lehongre

(10) Patent No.: US 6,468,175 B1
(45) Date of Patent: Oct. 22, 2002

(54) HYBRID ENGINE TRANSMISSION UNIT COMPRISING A DOUBLE PLANETARY GEAR TRAIN

(75) Inventor: Claude Lehongre, Paris (FR)

(73) Assignee: Renault, Boulogne Billancourt (FR)

( * ) Notice: Subject to any disclaimer, the term of this patent is extended or adjusted under 35 U.S.C. 154(b) by 0 days.

(21) Appl. No.: 09/582,631

(22) PCT Filed: Jan. 22, 1999

(86) PCT No.: PCT/FR99/00125
§ 371 (c)(1),
(2), (4) Date: Oct. 16, 2000

(87) PCT Pub. No.: WO99/37496
PCT Pub. Date: Jul. 29, 1999

(30) Foreign Application Priority Data

Jan. 26, 1998 (FR) .............................. 98 00795

(51) Int. Cl.⁷ ............................ F16H 3/72; F16H 37/06
(52) U.S. Cl. ............................ 475/5; 475/10; 180/65.2; 180/65.3
(58) Field of Search ................ 475/5, 10, 2, 4; 180/65.1–65.5

(56) References Cited

U.S. PATENT DOCUMENTS

| | | | | |
|---|---|---|---|---|
| 3,861,484 A | | 1/1975 | Joslin ...................... | 180/65 A |
| 5,603,671 A | * | 2/1997 | Schmidt ..................... | 475/5 |
| 5,730,675 A | * | 3/1998 | Yamaguchi ................ | 475/2 |
| 5,730,676 A | * | 3/1998 | Schmidt ..................... | 475/5 |
| 5,775,449 A | * | 7/1998 | Moroto et al. ............. | 180/65.2 |
| 5,904,631 A | * | 5/1999 | Morisawa et al. .......... | 475/5 |

FOREIGN PATENT DOCUMENTS

| | | |
|---|---|---|
| EP | 0 729 858 A | 9/1996 |
| EP | 0 751 025 A | 1/1997 |
| FR | 2 734 318 A | 11/1996 |
| FR | 2 742 703 A | 6/1997 |
| FR | 2742703 | * 6/1997 |

* cited by examiner

*Primary Examiner*—Sherry Estremsky
*Assistant Examiner*—Tisha D. Lewis
(74) *Attorney, Agent, or Firm*—Oblon, Spivak, McClelland, Maier & Neustadt, P.C.

(57) ABSTRACT

A motive power assembly for a vehicle with hybrid motorization functioning in a plurality of modes. The assembly includes a first planetary gear train having a first annulus, a first planet wheel, a first planet carrier and at least one first planet, linked in rotation to an output shaft of an electric motor, an output shaft of an internal combustion engine, a shaft of a rotor of an alternator and a power output to transmit motive power to wheels of the vehicle via a bridge. Also included is an electronic module for controlling an amount of charge of a battery package delivered to the electric motor and the alternator. A second planetary gear train is also provided and includes a second annulus, a second planet wheel, a second planet carrier and at least one second planet, one of which is linked in rotation to the output shaft of the electric motor and the others of which are linked to the power output of the first planetary gear train and to the bridge. The electronic module actuates an operation of the internal combustion engine, and a locking mechanism locks the output shaft of the internal combustion engine. Further, the first planetary gear train is coaxial with the second planetary gear train.

13 Claims, 7 Drawing Sheets

HYBRID ENGINE TRANSMISSION UNIT COMPRISING A DOUBLE PLANETARY GEAR TRAIN

BACKGROUND OF THE INVENTION

1. Field of the Invention

The invention relates to a motive power assembly for a vehicle with hybrid motorization equipped with a double planetary gear train.

The invention relates more particularly to a motive power assembly for a vehicle with hybrid motorization functioning in a plurality of modes, of the type equipped with a first planetary gear train provided with elements such as a first annulus, a first planet wheel, a first planet carrier and at least one first planet, linked in rotation to components of the motive power assembly, such as an output shaft of an electric motor, an output shaft of an internal combustion engine, a shaft of the rotor of an alternator and a power output to transmit motive power to the wheels of the vehicle, and of the type in which an electronic module for control of the charge of a battery package actuates, especially as regards torque and speed, the operation of the electric motor and of the alternator, which can be placed under load in particular to recharge the battery package.

2. Discussion of the Background

There are known numerous examples of motive power assemblies for vehicles with hybrid motorization. These fall essentially into two categories, the series hybrid units and the parallel hybrid units.

The series hybrids are motive power assemblies in which a piston-type internal combustion engine or a turbine drives a generator which produces electricity to energize one or more electric motors linked to the wheels of the vehicle. A battery package ensures storage of the electrical energy needed to operate the electric motor.

French Patent FR A 2734318 describes such a motive power assembly.

The efficiency of such a power transmission chain is good, but such a device suffers from the disadvantage of requiring bulky electrical components which lead to excessive on-board weight. The components used must in fact ensure propulsion of the vehicle at all speeds, thus necessitating the use of large-sized components. In addition, the vehicle is immobilized by failure of any one of the electrical components.

The parallel hybrids are motive power assemblies in which an internal combustion engine, an electric motor energized by a battery package and a transmission are mechanically coupled via a device which permits them to be linked in rotation to one another. They are generally devices equipped with a planetary gear train or gearbox, to the elements of which there are connected the electric motor, the internal combustion engine and the transmission.

The motive power assemblies of parallel hybrid type have the advantage that they can use both types of propulsion, internal combustion and electric, independently or simultaneously. Since the two motive units are coupled to one another, the vehicle can, for example, operate in pure electrical mode or in hybrid mode or even in pure internal combustion engine mode, depending on the use conditions, or in other words depending on the desired acceleration, or on where the vehicle is being used or on the speed of the vehicle. The change from one mode of operation to another is actuated by an electronic module.

SUMMARY OF THE INVENTION

This device makes it possible to use the motive power of the internal combustion engine directly for vehicle propulsion, while the electric motor has merely a booster function, thus allowing the use exclusively of electrical components of smaller dimensions and weights.

One of the functions assigned to the internal combustion engine is to recharge the battery package via the electric motor, which is then used as a generator. Such a motive power assembly does not require either an electric motor or bulky battery package. In addition, the possibility of using one of the motive units preferentially ensures that the vehicle will not be immobilized if the other motive unit fails. Finally, the mechanical coupling of the components makes it possible to start the internal combustion engine by driving its output shaft by the electric motor instead of doing so in the conventional manner by a starter, thus in turn making it possible to achieve appreciable weight savings and to reduce the production costs.

Other hybrid designs are also known, especially those in which the electric motor and the transmission are coupled to the elements of the planetary gear system and in which an alternator is also coupled mechanically to the planetary gear train for the purpose of recharging the battery package. In this type of configuration the motive power assembly is provided in certain cases with two sources for recharging the battery package, which are the alternator and the electric motor, which is used occasionally as a current generator.

A problem nevertheless arises as regards control of the torque and of the speed of rotation of the different elements.

It is known that an internal combustion engine operates at its best efficiency only at its speed corresponding to maximum torque. In a conventional vehicle propelled by an internal combustion engine, the internal combustion engine is the sole source of power and it is used at different speeds of rotation to achieve different vehicle velocities. In doing so, it operates only rarely at its speed corresponding to maximum torque, since it must give fresh impetus to the vehicle, especially after every gear change.

The problem is different in the case of a hybrid vehicle, where on the one hand the search for low consumption is the predominant concern and on the other hand an electric motor can be used. The premise in this case is to use the internal combustion engine as the power source at constant torque and speed, while the electric motor is capable of supplying the power boost necessary to achieve the desired accelerations.

It is therefore important for the electronic module to be able to perform a regulating action on the torque of the internal combustion engine, in order to permit it to operate at its speed corresponding to maximum torque. A simple solution to this end comprises ensuring fine control of the torques and speeds of the other elements of the hybrid propulsion chain, or in other words the electric motor and alternator, by means of the electronic module.

The problem not resolved by the existing devices results from the architecture comprising a planetary gear train for coupling the elements of the motive power assembly. In fact, since the elements are linked mechanically to one another by the planetary gear train, their torques and speeds of rotation are related to one another by the law of composition of speeds within the planetary gear train. This is advantageous in terms of power transmission but poses a problem when one element is in charge of actuation functions. For example, in the architecture described in the foregoing, the alternator is capable of delivering a resisting torque to one of the elements of the planetary gear train, thus ensuring that the torque from the motive unit is transmitted by engagement of the two other elements of the planetary gear train, especially when the electronic module actuates starting of the internal combustion engine by driving its output shaft. The resisting torque delivered by the alternator is then used for actuation purposes, but it is not used directly for propulsion of the vehicle.

Similarly, when the vehicle is propelled simultaneously by the electric motor and the internal combustion engine, the charged status of the battery package may be sufficient to ensure that operation of the alternator is not required. In this case it is not necessary to drive the alternator, because rotation thereof inevitably causes mechanical losses.

Finally, the limited number of three power inputs or outputs of a planetary gear train inevitably requires the mechanical coupling of two components of the motive power assembly to a single element of the planetary gear train, which coupling is generally achieved by connecting the electric motor to the bridge via one of the elements of the planetary gear train. In such a configuration, the mode of recharging of the battery package of the vehicle at standstill can be achieved only by means of the alternator, thus greatly prolonging the charging time. If the capability of using the electric motor as a current generator is desired, it is important that this motor can be disconnected from the bridge.

To meet these imperative criteria of decoupling of the components, the invention proposes a motive power assembly of the type mentioned hereinabove, characterized in that the motive power assembly is equipped with a second planetary gear train which is provided with elements such as a second annulus, a second planet wheel, a second planet carrier and at least one second planet, one of which is linked in rotation to the output shaft of the electric motor and the others of which are linked to the power output of the first planetary gear train and to the bridge in order to transmit the motive power to the wheels of the vehicle, and in that the electronic module actuates the operation of the internal combustion engine and the means for locking the output shaft of the internal combustion engine.

According to other characteristics of the invention:

the means for locking the output shaft of the internal combustion engine are provided with a brake functioning in active locking mode or in inactive mode on an engine flywheel linked in rotation to the output shaft of the internal combustion engine;

the first planetary gear train is coaxial with the second planetary gear train, the first planet carrier is linked in rotation to the second planet wheel and the first annulus is linked in rotation to the second annulus;

the first annulus and the second annulus form a common annulus, and in that the first planet carrier and the second planet wheel form a common hub;

the annulus common to the two planetary gear trains is linked in rotation to the output shaft of the electric motor, the first planet wheel is linked in rotation to the shaft of the alternator rotor, the common hub is linked in rotation to the output shaft of the internal combustion engine, and the second planet carrier is linked in rotation to the wheels of the vehicle;

the electronic module is capable of actuating a pure electrical mode of operation in which the brake of the engine flywheel is active and the alternator is not under load;

the electronic module is capable of actuating a mode of operation of starting of the internal combustion engine by the electric motor, in which mode the brake of the engine flywheel is inactive and the alternator is under load;

the electronic module is capable of actuating a free hybrid mode of operation in which both motive units are running, the brake of the engine flywheel is inactive and the alternator is under load;

the electronic module is capable of actuating, when the vehicle is at standstill, a mode of operation of recharging of the battery package, in which mode the internal combustion engine is running and the brake of the engine flywheel is inactive, the alternator is under load and the electric motor is used as a current generator;

the motive power assembly is provided with a brake for locking the shaft of the alternator rotor, which brake can be actuated in an active locking mode or in an inactive mode by the electronic module;

the electronic module is capable of actuating a locked hybrid mode of operation in which both motive units are running, the brake of the engine flywheel is inactive, the brake of the shaft of the alternator rotor is active and the alternator is under load;

the linking in rotation of the output shaft of the electric motor to the annulus and the linking in rotation of the second planet carrier to the bridge are achieved via transmission components such as serrated belts or chains;

the motive power assembly is provided with a common case, which accommodates the two planetary gear trains, the transmission components, a bridge, on which there are fixed the electric motor, the alternator and the internal combustion engine.

BRIEF DESCRIPTIONS OF THE DRAWINGS

Other characteristics and advantages of the invention will become clear upon reading the detailed description hereinafter, which will be understood with reference to the attached drawings, wherein.

Figure 2:
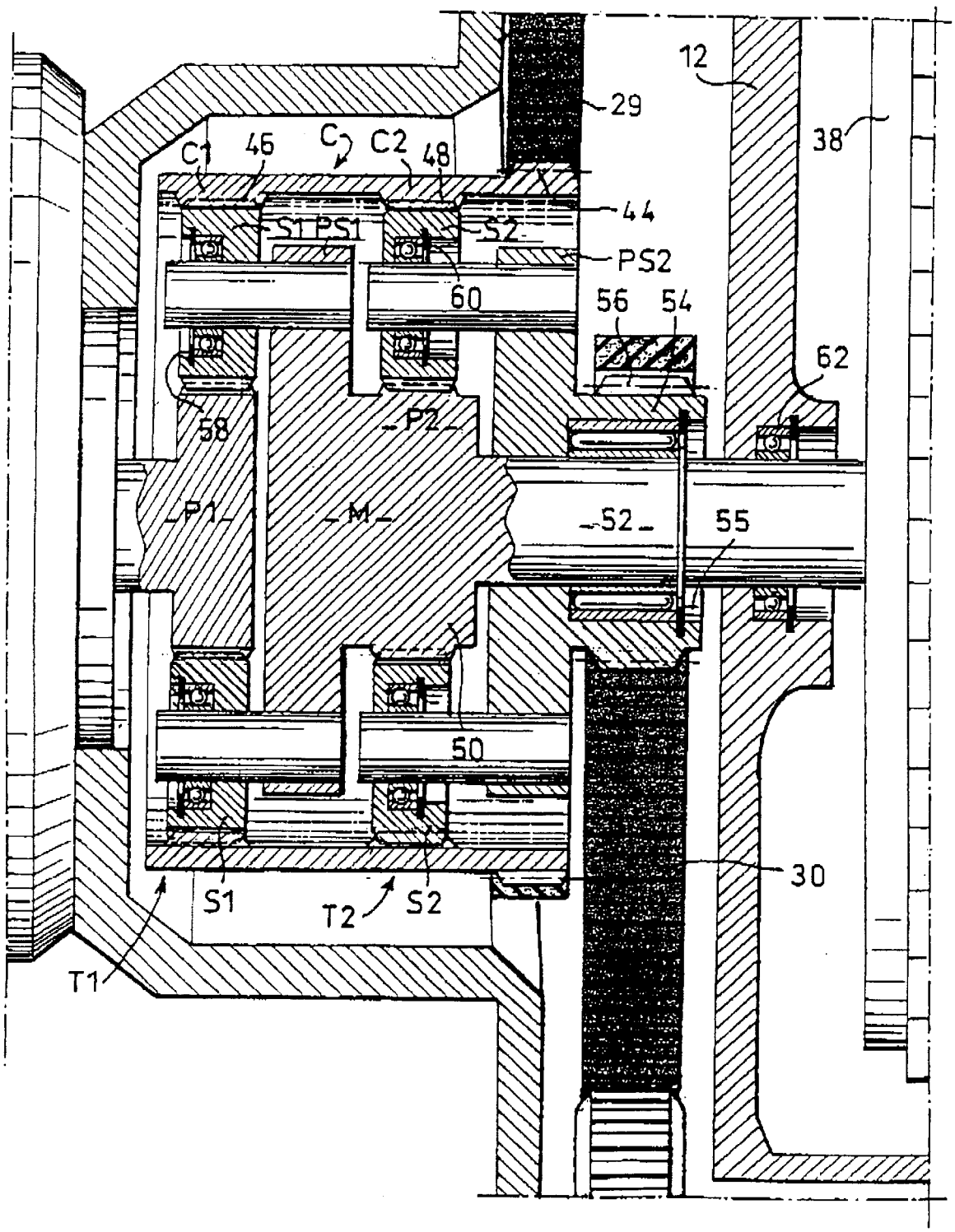
FIG. 2 is a view in axial section of the double planetary gear train of the motive power assembly constructed according to the invention.
Figure 6:
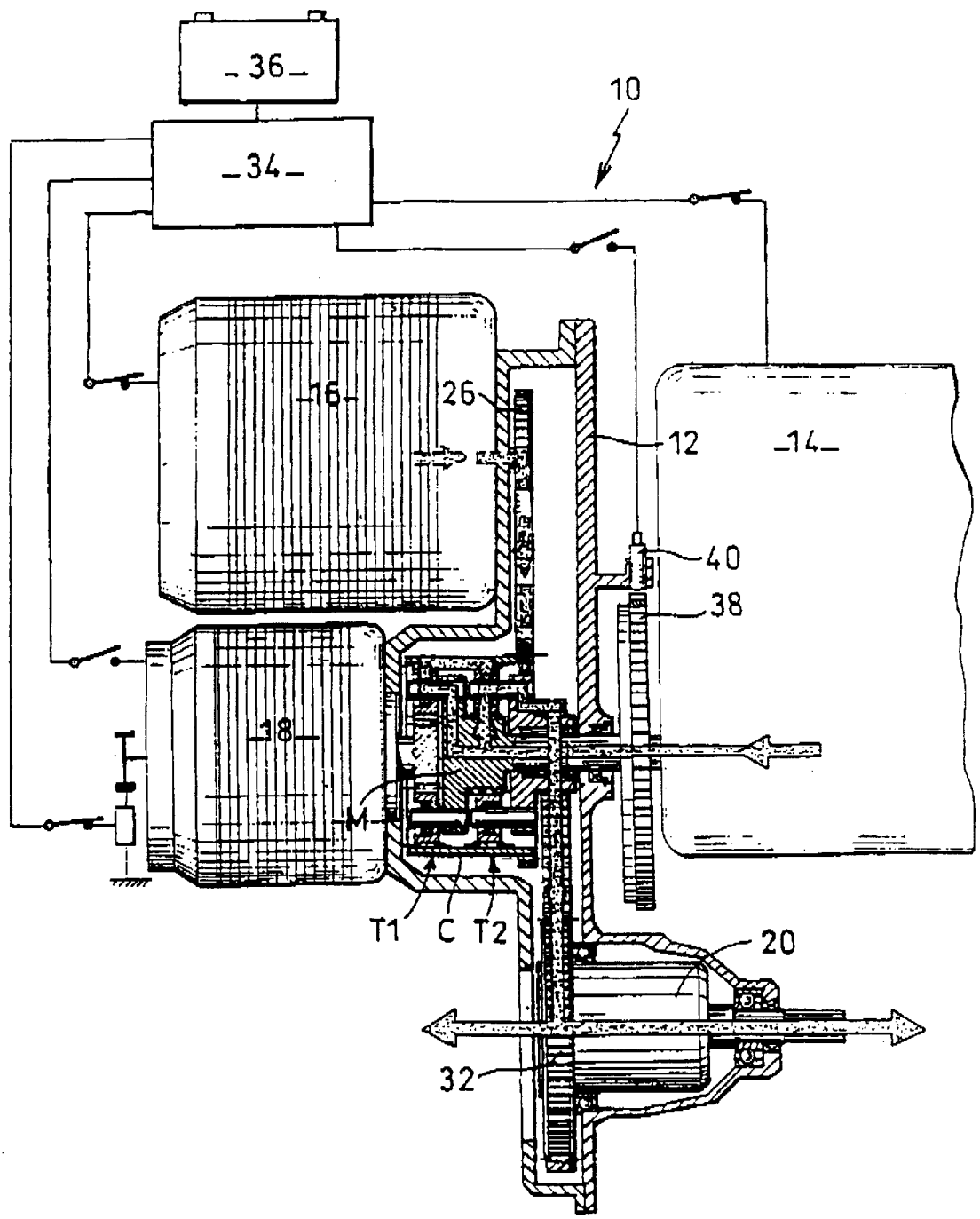
Figure 7:
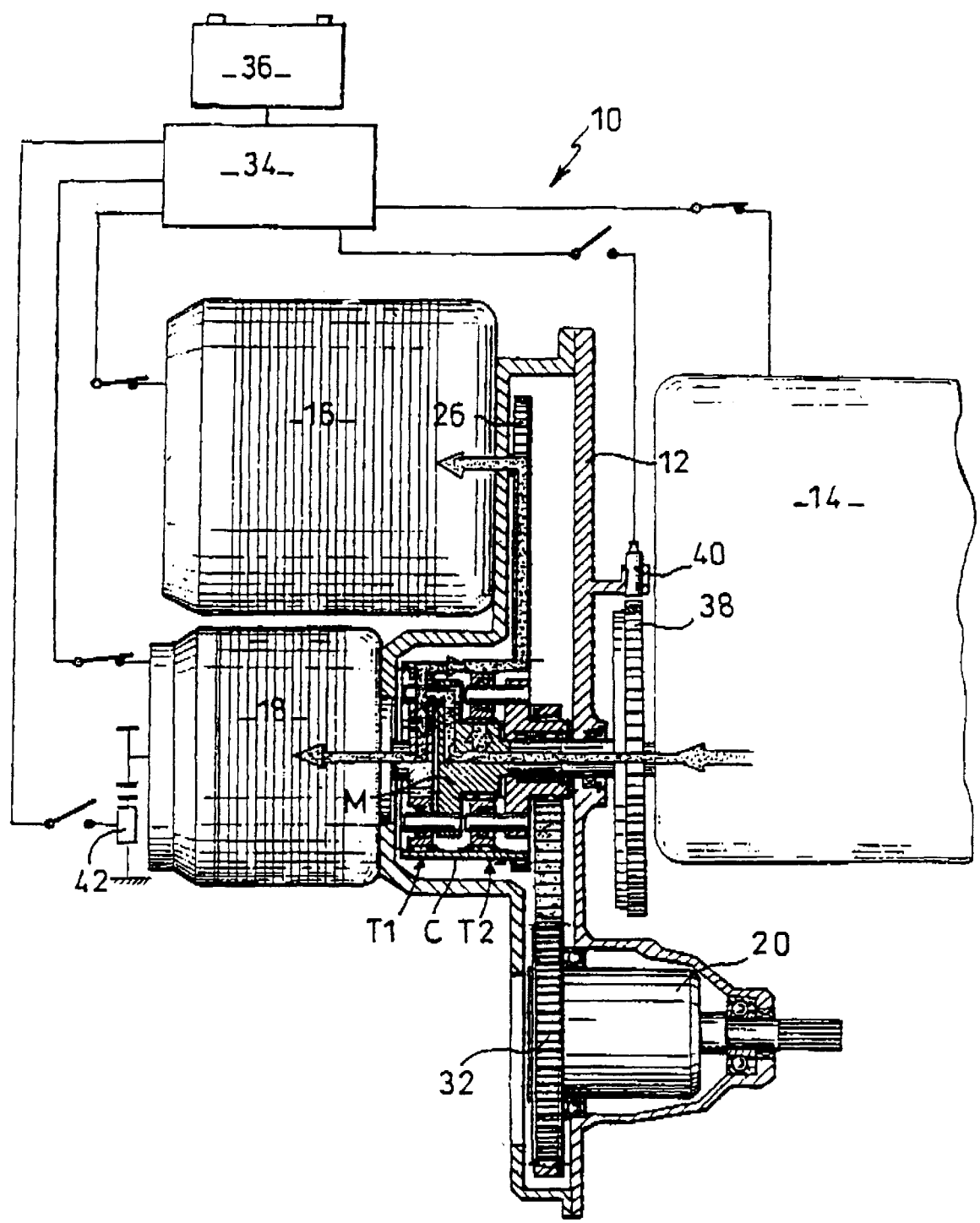

FIG. 6 is a diagram analogous to that of FIG. 2, representing a motive power assembly according to the invention, shown in a locked hybrid mode of operation, the alternator being locked, the internal combustion engine transmitting its torque to the bridge and the electric motor being capable of delivering a booster torque, which is represented by a discontinuous gray-shaded arrow; and FIG. 7 is a diagram analogous to that of FIG. 2, representing a motive power assembly according to the invention, shown in a mode of operation during vehicle standstill, where recharging of the battery package is possible.

DESCRIPTION OF THE PREFERRED EMBODIMENTS

Figure 1:
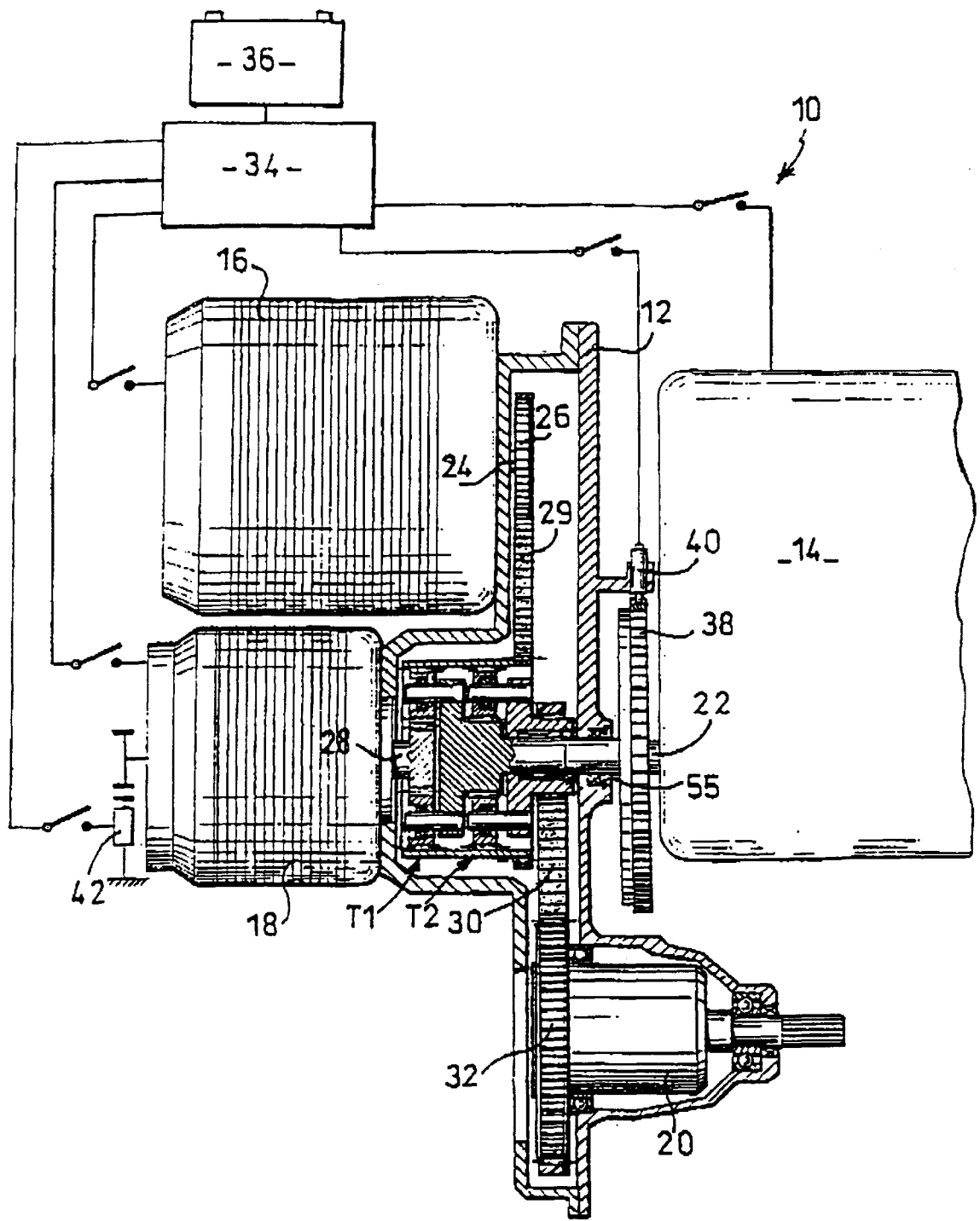
FIG. 1 is a schematic diagram of a motive power assembly according to the invention, equipped with a battery package, an electronic module, two motive units, one an electric motor and the other an internal combustion engine, an alternator, a locking brake associated with the alternator and a locking brake associated with the internal combustion engine.

FIG. 1 shows the complete motive power assembly 10 for a vehicle with hybrid motorization constructed according to the invention. Motive power assembly 10 is provided with different components such as an internal combustion engine 14, an electric motor 16, an alternator 18, two planetary gear trains T1, T2, and a bridge 20, via which the torque can be transmitted to the wheels of the vehicle. These different components are disposed around and inside a case 12, which houses planetary gear trains T1 and T2.

Planetary gear trains T1 and T2 are provided respectively with elements such as a first annulus C1, a first planet wheel P1, a first planet carrier PS1 and first planets S1 on the one hand, and with a second annulus C2, a second planet wheel P2, a second planet carrier PS2 and second planets S2 on the other hand.

These elements are linked in rotation to internal combustion engine 14, electric motor 16, alternator 18 and bridge 20.

Planetary gear trains T1, T2 are linked in rotation to internal combustion engine 14 via an output shaft 22 of the internal combustion engine, to electric motor 16 via a transmission belt 28, which engages with a pinion 26 carried by an output shaft 24 of electric motor 16, to the alternator by an output shaft 28 of the rotor (not shown) of alternator 18, and to bridge 20 by a transmission belt 30, which engages with an input pinion 32 of bridge 20.

Motive power assembly 10 is provided with an electronic actuation and control module 34, which is connected to a battery package 36 and which actuates the operation of internal combustion engine 14, of electric motor 16 and of alternator 18 by fine control in particular of their torque(s) and their speed(s) of rotation.

According to the invention, output shaft 22 of internal combustion engine 14 is provided with a flywheel 38, which is capable of being locked by a locking brake 40 actuated by electronic module 34. In analogous manner, output shaft 28 of the rotor (not shown) of alternator 18 is capable of being locked by a locking brake 42, which is also actuated by electronic module 34. These locking brakes 40 and 42 permit indirect locking of certain elements of planetary gear trains T1, T2.

This configuration is particularly advantageous, because the motive power assembly, in contrast to other constructions, is provided with only one electric motor. The manufacturing costs, including the costs of the alternator and of the associated electronics, are reduced commensurately.

FIG. 2 shows the detail of the coaxial arrangement of planetary gear trains T1 and T2. According to the invention, the respective annuli C1 and C2 of planetary gear trains T1 and T2 form a common annulus C, which engages via a set of external teeth 44 with serrated transmission belt 29, which is driven by electric motor 16.

Annulus C is provided with two sets of internal teeth 46 and 48, which engage respectively with planets S1 of planetary gear train T1 and planets S2 of planetary gear train T2. Planets S1 engage with planet wheel P1, which is linked in rotation to output shaft 28 of alternator 18, and they are carried by a planet carrier PS1, which belongs to a hub M, an axially adjacent part 50 of which comprises planet wheel PS2 of planetary gear train T2, and an adjacent part 52 of which is linked in rotation to output shaft 22 of internal combustion engine 14.

In addition, planet carrier PS2 of planetary gear train T2 is provided on a part 54 with a set of teeth 56 which engage with transmission belt 30, which drives bridge 20 to transmit the movement to the wheels of the vehicle.

Planet carrier PS2 is provided, in a bore 55 of its part 54, with a bearing which permits hub M comprising planet carrier PS1 of planetary gear train T1 and planet wheel P2 of planetary gear train T2 to be guided in rotation. Since annulus C has great length, planets S1 and S2 are mounted on the shafts of planet carriers PS1 and PS2 by means of ball races 58 and 60, which permit small angular deflections of planets S1, S2 and ensure that any risk of locking is prevented.

Hub M also passes through case 12, and its output shaft 52 is supported by a bearing 62, which is also provided with a ball race that permits slight angular deflections of hub M.

Advantageously the two planetary gear trains are coupled on the one hand by annulus C, thus permitting the entirety of the two planetary gear trains T1, T2 to have smaller overall radial dimension, and on the other hand by hub M, which comprises planet carrier PS1 and planet wheel P2, thus permitting smaller overall longitudinal dimension to be achieved.

This device is also particularly advantageous in terms of maintenance, since the two planetary gear trains T1 and T2 are disposed in annulus C, which permits, in the event of breakdown, simple and rapid disassembly of the entirety of planetary gear trains T1 and T2, a procedure, which is made even easier by the fact that their means of communication with electric motor 16 and bridge 20 are belts 28 and 30.

Similarly, hub M can be easily decoupled from output shaft 22 of internal combustion engine 14 by a fixation on flywheel 38.

In the description hereinafter of attached drawings 3 to 7, the reference numerals of FIGS. 1 and 2 will be used for the already described individual elements of the invention.

To aid in understanding of the figures and of the different modes of operation, the connection of module 34 to the different components is illustrated schematically by means of circuits provided with switches which, according to whether they are in open or closed positions, permit the reader to identify which components are being actuated or energized and/or placed under load.

Figure 3:
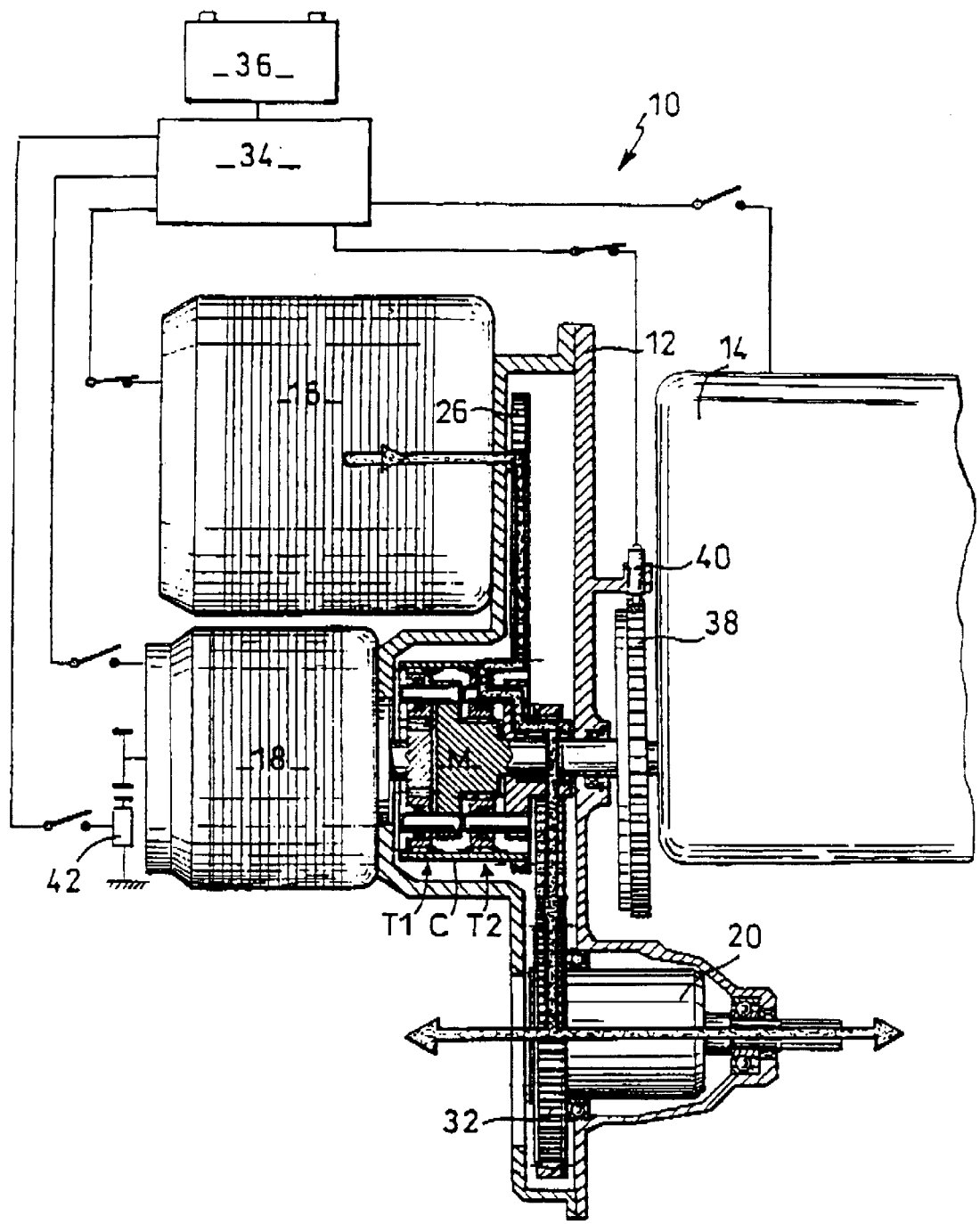
FIG. 3 is a schematic diagram of the operation of the components involved in the power transmission chain of a motive power assembly according to the invention, shown in a pure electrical mode of operation, where the continuous gray-shaded arrows indicate the torques delivered, received and transmitted by the different components of the motive power assembly.

According to the invention, FIG. 3 illustrates the operation of motive power assembly 10 in a pure electrical mode. In this configuration, electric motor 16 is actuated by electronic module 34 and delivers torque to annulus C of the two planetary gear trains T1, T2 via its output pinion 26, which is mounted on its output shaft 24, and via transmission belt 28. To ensure that internal combustion engine 14 is not driven as a pure loss, brake 40 of flywheel 38 is active and locks shaft 22 of the internal combustion engine. By this fact, hub M is immobile and planets S1 turn freely around their pins, because alternator 18 is not under load and output shaft 28 of the alternator is not braked, since brake 42 is inactive.

The torque is therefore transmitted from output shaft 24 of electric motor 16 to output pinion 26, to transmission belt 28, to annulus C, then to planet S2 by its set of internal teeth 48, to planet carrier PS2, the teeth 56 of which permit transmission of the torque to transmission belt 30, which drives bridge 20 via pinion 32.

This configuration is particularly interesting, because it permits internal combustion engine 14 to be totally locked, thus ensuring that mechanical losses do not occur because internal combustion engine 14 is being driven while it is idle.

In addition, since shaft 22 of internal combustion engine 14 is locked, the first planetary gear train acts as a speed-reducing gear between the electric motor and the wheels of the vehicle.

Finally, since alternator 18 is not under load but is free to turn, only a negligible part of the torque is transmitted thereto.

Figure 4:
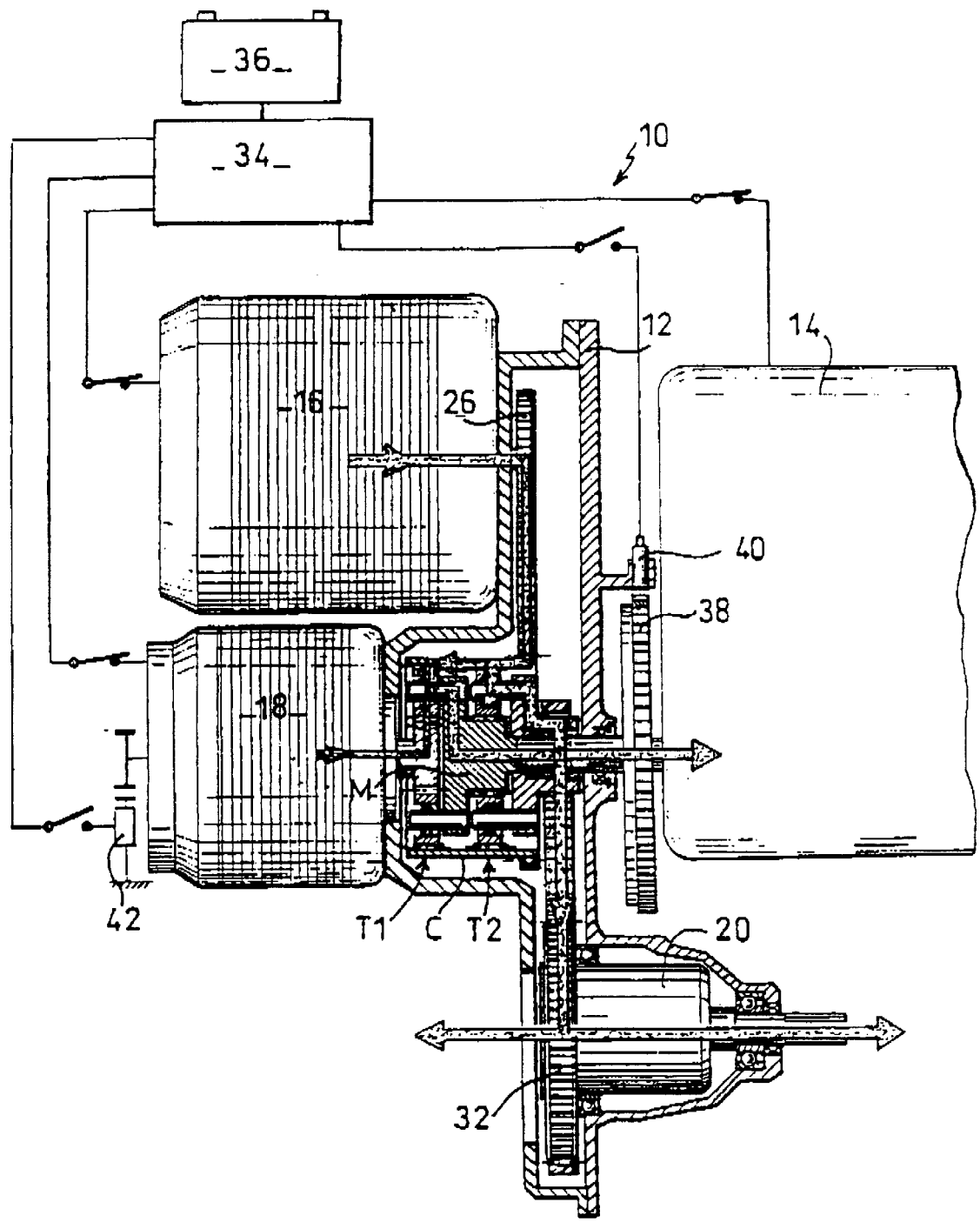
FIG. 4 is a diagram analogous to that of FIG. 3, representing a motive power assembly according to the invention, shown in a mode of operation of starting of the internal combustion engine.

FIG. 4 shows an illustration of motive power assembly 10 in the mode of starting of internal combustion engine 14.

This mode of operation occurs at the end of operation in pure electrical mode and it has the same main aspects, and it ensures that, once the vehicle is moving, internal combustion engine 14 can be started by means of electric motor 16 and the inertia of the vehicle, which drives bridge 20.

In this configuration, electronic module 34 actuates the loading of alternator 18, which has the effect of applying a resisting torque which opposes planet wheel P1. In addition, locking brake 40 of flywheel 38 of internal combustion engine 14 is inactive, and electronic module 34 controls all the parameters necessary for operation of internal combustion engine 14, such as supplying voltage to the ignition system, feeding fuel, energizing the injection device, etc.

In this configuration, the torque is transmitted, as described hereinabove with reference to FIG. 3, from electric motor 16 to annulus C of the entirety of planetary gear trains T1 and T2 and, since hub M is free to turn at the same time as planet wheel P1 and applies a resisting torque which opposes planets S1, part of the torque originating from electric motor 16 is transmitted to hub M by reaction of planets S1 on planet wheel P1. The rotation of hub M drives output shaft 22 of internal combustion engine 14, which can then start. As internal combustion engine 14 picks up speed, the speed of rotation of hub M increases in proportion and the resisting torque applied in opposition by alternator 18 decreases.

This device advantageously permits internal combustion engine 14 to be started without the need to use a conventional starter. Alternator 18 is used in this case as a retarder, the function of which is essentially an actuation function. In fact, although the action of placing the alternator under load permits production of current, the main purpose thereof is to retard the rotation of planet wheel P1 to allow hub M and thus output shaft 22 of the internal combustion engine to be driven.

This configuration also ensures that there is no need to use alternator brake 42, which would have the effect, if it were active, of also permitting hub M to be driven, but would risk causing deterioration of the teeth when, during starting of internal combustion engine 14, hub M would have reached a speed of rotation substantially equal to that of annulus C.

Finally, the connection of bridge 20 to planet carrier PS2 makes it possible to use the inertia of the vehicle as a source of torque which can be transmitted to annulus C to drive, via planets S1 and hub M, output shaft 22 of internal combustion engine 14 in order to start the said engine. This practical feature makes it possible to limit the electric power consumed by electric motor 16 and thus to increase the self-sufficiency of battery package 36.

Figure 5:
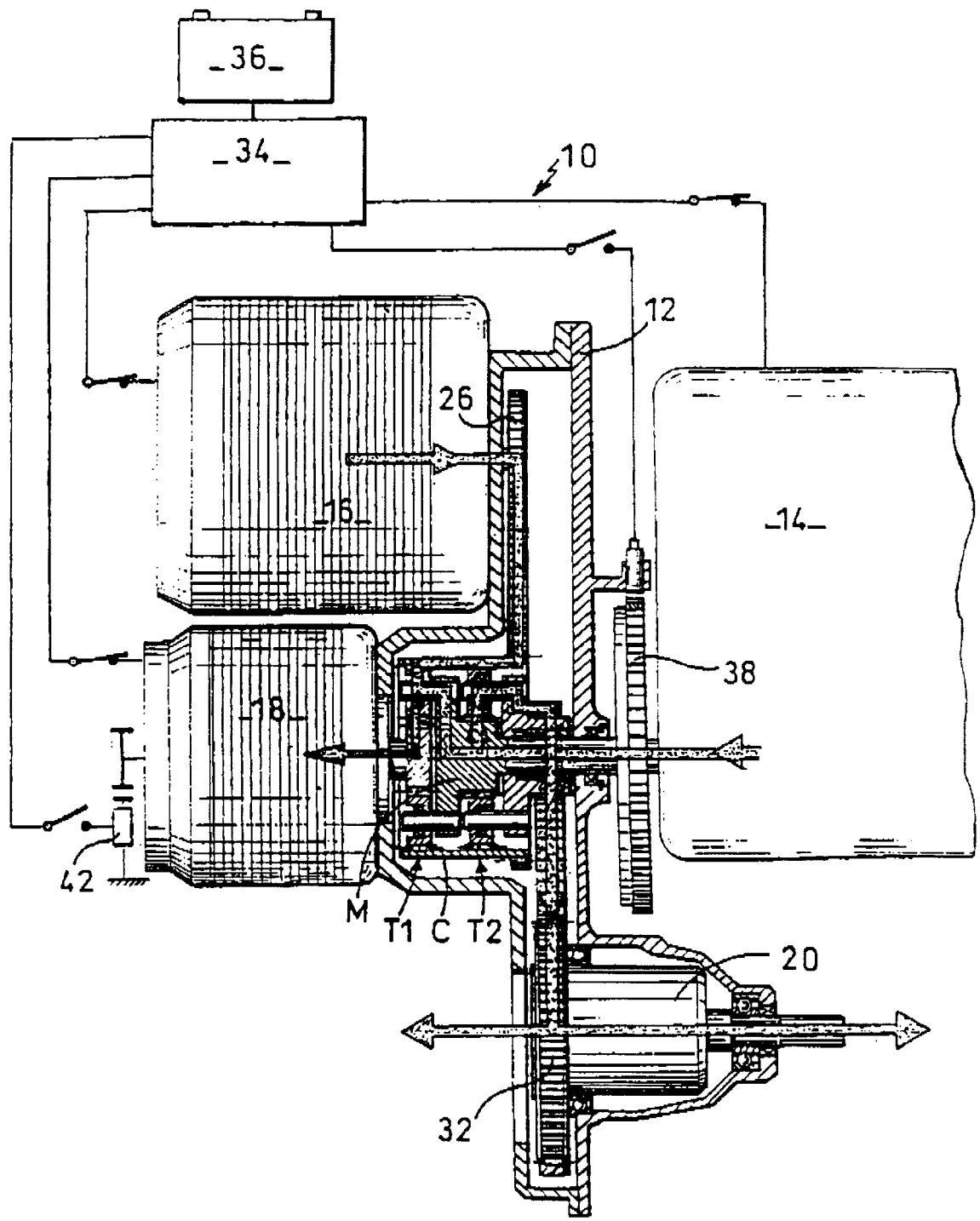
FIG. 5 is a diagram analogous to that of FIG. 2, representing a motive power assembly according to the invention, shown in a free hybrid mode of operation, the alternator turning to recharge the battery package.

FIG. 5 illustrates a configuration of motive power assembly 10 in free hybrid mode of operation. In this configuration, motive power assembly 10 operates in a manner similar to that described with reference to FIG. 4, the only difference being that internal combustion engine 14 is running and delivering torque to its output shaft 22 and thus to hub M.

This torque is distributed by planets S1 on the one hand between annulus C common to planetary gear trains T1 and T2, and on the other hand to planet wheel P1, which is linked in rotation to the shaft of rotor 28 of alternator 18.

Thus the resisting torque of alternator 18 is overcome to produce a current which permits, by virtue of the control by electronic module 34, recharging of battery package 36. In addition, the torque delivered by electric motor 14 to hub M is combined in annulus C common to planetary gear trains T1 and T2 with the torque delivered by electric motor 16, to be transmitted to planet S2, to planet carrier PS2 and thus to bridge 20.

This device is particularly advantageous, because it ensures propulsion of the vehicle by a torque originating from the internal combustion engine and a torque originating from the electric motor, electronic module 34 ensuring optimization of the performances of motive power assembly 10. In fact, electronic module 34 actuates the supply to electric motor 16, which it can regulate in terms of torque and speed on the one hand, and also ensures regulation of the torque and consequently of the speed of alternator 18, thus permitting the torque delivered by internal combustion engine 14 to be distributed adequately by acting on the distribution capabilities of planetary gear train T1. Thus internal combustion engine 14 can be maintained at its speed corresponding to maximum torque and best efficiency. The efficiency of the traction chain thereof is optimized commensurately. This mode of use provides the same capabilities of fine control of the internal combustion engine as does a series hybrid, which is advantageous in terms of optimization of fuel consumption and of urban pollution, without suffering from the disadvantages thereof, since part of the power of the internal combustion engine is transmitted to the wheels. The direct transmission of part of this power makes it possible to employ electric machines of smaller size.

In addition, this mode of operation also permits propulsion of the vehicle and recharging of battery package 36 to be achieved simultaneously, since alternator 18 is under load.

Finally, it is possible to choose not to use internal combustion engine 14 at its maximum torque and best efficiency condition if the charged status of the battery package makes it necessary to give priority to the speed of rotation corresponding to best efficiency of the alternator.

FIG. 6 illustrates a configuration in which motive power assembly 10 is operating in locked hybrid mode. This configuration differs from the preceding by the fact that brake 42 of the shaft of rotor 28 of alternator 18 is locked. In this case, the torque originating from internal combustion engine 14 and transmitted to hub M is transmitted in its entirety to annulus C via planets S1, which roll on planet wheel P1 of output shaft 28 of the alternator, which shaft is locked. This torque may be added if necessary to the torque delivered by electric motor 16, if the user's needs require its operation, and it is transmitted to planet carrier PS2 of second planetary gear train T2 via planets S2, after which it is transmitted to bridge 20.

This configuration is particularly interesting, since it permits the entirety of the torque delivered by internal combustion engine 14 to be transmitted to bridge 20, especially under certain conditions of use, such as road or expressway driving. The operation of the vehicle equipped with such a motive power assembly is that of a parallel hybrid, with excellent consumption ratio on the road and on the expressway, because the torque of the internal combustion engine can be controlled by the electric motor despite the locking of the shaft of the alternator rotor. The possibility of using electric motor 16 as a source of booster torque permits motive power assembly 10 to impart high accelerations to the vehicle. On the other hand, if the electric motor is placed under load, it can also be used to recharge the batteries and function as a brake.

FIG. 7 illustrates a configuration in which motive power assembly 10 operates in a mode of recharging of battery package 36. In this configuration, the vehicle is at standstill, and so bridge 20 and planet carrier PS2 of planetary gear train T2 are immobilized against rotation. Internal combustion engine 14 transmits its torque to hub M, part of which torque is transmitted to alternator 18 by the engagement of planets S1 with planet wheel P1 while another part is transmitted to electric motor 16 by the engagement of annulus C with transmission belt 28, which drives output shaft 24 of electric motor 16 in rotation.

Electronic module 34 then actuates the use of electric motor 16 as a generator, and recharging of battery package 36 is improved to the extent that electric motor 16 functions as a generator analogous to that of alternator 18.

Electronic module 34 determines, as a function of the speed of rotation of the elements involved, the extent to which electric motor 16 and alternator 18 must contribute to recharging, by regulating the torque delivered thereto. In fact, for both electric motor 16 and alternator 18, the resisting torque which they apply in opposition to the rotational movement is a function of the voltage which the electronic module delivers to their stators.

This configuration is particularly advantageous, because it permits battery package 36 to be recharged rapidly at much higher rate than in any of the preceding modes, as is necessary in order to undertake rapid recharging when the battery charge is exhausted and when the conditions of use, especially in the city, necessitate the use of motive power assembly 10 in pure electrical operation.

More generally, this hybrid architecture of the motive power assembly is particularly advantageous because it permits changing from one mode of operation to another without manipulation of heavy mechanical assemblies and the associated risk of causing malfunctions. For example, the change from pure electrical mode to the mode of starting of internal combustion engine 14 is achieved by simply switching alternator 18 to load position, while the position of free hybrid mode is assumed as soon as internal combustion engine 14 has started, and simple locking of brake 42 of alternator 18 permits motive power assembly 10 to change to a locked hybrid mode of operation. The mode of recharging battery package 36 can be achieved very simply from a standstill position, in which the vehicle is initially in pure electrical propulsion mode.

This motive power assembly is also particularly advantageous, because the use of an architecture comprising two planetary gear trains makes it possible to provide two different reduction ratios between the internal combustion engine or electric motor and the wheels, thus making it possible to use motive units of appropriate size, reduced to the strict minimum, and in turn achieving considerable weight savings. In addition, the choice of a reduction ratio by locking elements of the planetary gear trains offers the vehicle a broad range of speeds, from zero speed to the maximum speed attained in locked hybrid operation.

What is claimed is:

1. A motive power assembly for a vehicle with hybrid motorization functioning in a plurality of modes, comprising:

a first planetary gear train including a first annulus, a first planet wheel, a first planet carrier and at least one first planet, linked in rotation to an output shaft of an electric motor, an output shaft of an internal combustion engine, a shaft of a rotor of an alternator and a power output to transmit motive power to wheels of the vehicle via a bridge;

an electronic module configured to control an amount of charge of a battery package delivered to the electric motor and the alternator; and a second planetary gear train including a second annulus, a second planet wheel, a second planet carrier and at least one second planet, one of which is linked in rotation to the output shaft of the electric motor and the others of which are linked to the power output of the first planetary gear train and to the bridge, wherein the electronic module actuates an operation of the internal combustion engine and a locking mechanism locks the output shaft of the internal combustion engine, and wherein the first planetary gear train is coaxial with the second planetary gear train.

2. The motive power assembly according to claim 1, wherein the locking mechanism includes a brake functioning in an active locking mode or in an inactive mode on an engine flywheel linked in rotation to the output shaft of the internal combustion engine.

3. The motive power assembly according to claim 1, wherein the first planet carrier is linked in rotation to the second planet wheel and the first annulus is linked in rotation to the second annulus.

4. The motive power assembly according to claim 3, wherein the first annulus and the second annulus form a common annulus, and the first planet carrier and the second planet wheel form a common hub.

5. The motive power assembly according to claim 4, wherein the annulus common to the first and second planetary gear trains is linked in rotation to the output shaft of the electric motor, the first planet wheel is linked in rotation to the shaft of the rotor of the alternator, the common hub is linked in rotation to the output shaft of the internal combustion engine, and the second planet carrier is linked in rotation to the wheels of the vehicle.

6. The motive power assembly according to claim 5, wherein the electronic module actuates a pure electrical mode of operation by activating the brake of the engine flywheel and the alternator is not under load.

7. The motive power assembly according to claim 5, wherein the electronic module actuates a mode of operation of starting of the internal combustion engine by the electric motor, in which mode the brake of the engine flywheel is inactive and the alternator is under load.

8. The motive power assembly according to claim 5, wherein the electronic module actuates a free hybrid mode of operation in which the internal combustion engine and the electric motor are running, the brake of the engine flywheel is inactive, and the alternator is under load.

9. The motive power assembly according to claim 4, wherein the electronic module actuates, when the vehicle is at standstill, a mode of operation of recharging of the battery package, in which mode the internal combustion engine is running and the brake of the engine flywheel is inactive, the alternator is under load, and the electric motor is used as a current generator.

10. The motive power assembly according to claim 1, further comprising:

a brake configured to lock the shaft of the rotor of the alternator, said brake being actuated in an active locking mode or in an inactive mode by the electronic module.

11. The motive power assembly according to claim 9, wherein the electronic module actuates a locked hybrid mode of operation in which both the internal combustion engine and the electric motor are running, the brake of the engine flywheel is inactive, the brake of the shaft of the rotor of the alternator is active, and the alternator is under load.

12. The motive power assembly according to claim 5, wherein the linking in rotation of the output shaft of the electric motor to the annulus and the linking in rotation of the second planet carrier to the bridge are achieved via transmission components including serrated belts or chains.

13. The motive power assembly according to claim 12, further comprising:

a common case accommodating the first and second planetary gear trains, the transmission components and the bridge, and on which there are fixed the electric motor, the alternator and the internal combustion engine.

* * * * *